United States Patent [19]

Yankowsky et al.

[11] Patent Number: 4,462,855
[45] Date of Patent: Jul. 31, 1984

[54] PROCESS FOR BONDING POLYESTER REINFORCEMENT ELEMENTS TO RUBBER

[75] Inventors: Anthony W. Yankowsky, Fort Mill, S.C.; Harry W. Stanhope, Charlotte, N.C.; Darrell D. Hicks, Jeffersontown, Ky.

[73] Assignee: Celanese Corporation, New York, N.Y.

[21] Appl. No.: 393,218

[22] Filed: Jun. 28, 1982

[51] Int. Cl.³ ............................................. C09J 5/02
[52] U.S. Cl. ................................. 156/307.3; 152/359; 156/315; 156/335; 156/910; 427/407.1
[58] Field of Search .................... 156/314, 315, 307.3, 156/335, 395, 110 A, 110 C, 110 MD, 910; 427/407.1; 152/359; 264/136

[56] References Cited

U.S. PATENT DOCUMENTS

| | | | |
|---|---|---|---|
| 3,179,547 | 4/1965 | Kigane et al. | 156/315 |
| 3,234,067 | 2/1966 | Krysiak | 156/330 |
| 3,272,676 | 9/1966 | Kigane et al. | 156/330 |
| 3,307,966 | 3/1967 | Shoaf . | |
| 3,433,768 | 3/1969 | Muhlberger et al. | 156/335 |
| 3,503,845 | 3/1970 | Hollatz et al. | 156/330 |
| 3,549,740 | 12/1970 | Schwarz | 264/136 |
| 3,663,268 | 5/1972 | Wilson | 156/335 |
| 3,793,425 | 2/1974 | Arrowsmith | 156/330 |
| 3,933,677 | 1/1976 | Aufdermarsh | 156/335 |
| 4,031,288 | 6/1977 | Bhakuni | 427/407.1 |
| 4,044,189 | 8/1977 | Arrowsmith . | |
| 4,247,658 | 1/1981 | Arrowsmith . | |
| 4,382,993 | 5/1983 | McIntyre et al. | 156/110 A |

FOREIGN PATENT DOCUMENTS 55-62269 of 1980 Japan .
0816640 7/1959 United Kingdom .

OTHER PUBLICATIONS

TBI 29, Fortrel Type 900 Polyester Industrial Yarn, Celanese Fibers Marketing Company, Oct. 1977, p. 9.
Organic Isocyanates and Bonding Polymers to Textiles, H. Foulkes and D. L. Loan, Rapra Technical Review No. 40, (1967).
Blocked Isocyanates, Z. W. Wilkes, Jr., Progress in Organic Coating, vol. 3, pp. 73–79, (1973).
"Textile to Rubber Bonding", Meyrick, T. J., and Watts, J. T., Proc. I.R.I. 13, pp. 52–66, (1966).
"Mechanics of Pneumatic Tires", U.S. Department of Transportation, Samuel K. Clark, (1981), pp. 96–101.

Primary Examiner—Edward C. Kimlin
Assistant Examiner—Timothy W. Heitbrink
Attorney, Agent, or Firm—S. M. Bodenheimer, Jr.

[57] ABSTRACT

Polyester reinforcement fibers are treated to improve adhesion to rubber by applying a dissolved aromatic urethane coating to the fibers followed by coating the fibers with a resorcinol-formaldehyde latex and then heating the fibers sufficiently to convert the aromatic urethane to an aromatic isocyanate and applying to and curing a layer of rubber on said treated polyester fibers.

10 Claims, No Drawings

PROCESS FOR BONDING POLYESTER REINFORCEMENT ELEMENTS TO RUBBER

BACKGROUND OF THE INVENTION

The invention relates to a process for bonding polyester reinforcement elements to rubber.

Polyester fibers, cords and fabrics are used extensively for reinforcing rubber articles such as tires, belts, hoses and the like. But, polyester textile elements generally adhere poorly to rubber unless first treated to improve adhesion, as by coating. Because of the exceptional strength and reinforcing ability of polyester fibers there has been a continuous effort to improve the adhesion of polyesters to rubber.

One widely used process for adhering polyester to rubber involves coating polyester with a resorcinol-formaldehyde latex followed by heat treating the coated polyester which is then incorporated into rubber. But, this system can be unsatisfactory depending on factors such as the degree of polyester heat treatment; the composition of the polyester substrate; the amount of stress and heat the reinforced rubber article undergoes; and the like.

Active isocyanates, particularly the polyisocyanates, have been added to resorcinol-formaldehyde latexes to further improve polyester to rubber adhesion. But, the rapid reaction of isocyanates in water and the toxicity of isocyanate compounds are shortcomings to this system. To overcome these problems, the isocyanates have been added in "blocked" form to latexes. Thus, isocyanates are reacted with blocking agents, most notably phenol, to provide compounds which are stable at normal temperatures but which, upon heat treatment at above about 100° C., disassociate to form a free isocyanate and phenol. A polyester substrate is coated with the mixture of resorcinol-formaldehyde and blocked isocyanate. Upon subsequent heat treatment of the coated polyester, the isocyanate is formed, in situ. This improves bonding between the latex and polyester.

Blocked isocynates, such as alcohol or phenol blocked isocyanates, i.e. urethanes, are however, typically water-insoluble and must be added to the latex as an aqueous emulsion or as a solids dispersion. It is difficult to achieve and maintain a uniform dispersion of the urethane throughout the resorcinol-formaldehyde latex. This can lead to non-uniform adhesion of the polyester substrate to the rubber.

Polyepoxides have also been added to the latex-urethane mixtures, see U.S. Pat. Nos. 3,234,067 to Krysiak and 3,933,677 to Auftermarsh. Since these systems involve emulsions or dispersions of the urethane, as above, uniformity of adhesion can be subject to question.

It has been suggested to precoat polyester fibers prior to latex dipping, with an aqueous emulsion containing a dispersion of blocked isocyanate solids. (TBI 29; FORTREL® TYPE 900 POLYESTER INDUSTRIAL YARN; Celanese Fibers Marketing Company; October 1977, page 9). This predip does result in increased adhesion. But as with previous systems which employ solids dispersions, coating uniformity is difficult to control, and the availability of reaction sites is lessened with solid reactants.

It has also been proposed to coat polyester fibrous substrates with the combination of a polyepoxide compound and a blocked isocyanate compound which is then heated causing unblocking of the polyisocyanate and curing of the epoxide/isocyanate coating. The coated polyester is then treated in a resorcinol-formaldehyde latex which may contain other materials, followed by a second heat treatment and bonding to rubber. Such processes are disclosed in U.S. Pat. Nos. 3,272,676 to Kigane et al; 3,307,966 to Schoaf; 3,503,845 to Hollatz et al; and Japanese Patent Publication No. 62,269/1980 to Takada. The dual heat treatments required by these processes involve increased energy usage with attendant increased cost. Additionally, unblocking the isocyanate prior to exposing the polyester to resorcinol-formaldehyde bath renders the isocyanate unavailable for reaction with the resorcinol-formaldehyde.

Numerous other treatments for adhering polyester to rubber have been proposed, but none has been completely successful in overcoming adhesion difficulties. There is thus a continuing need for improving processes for adhering polyester to rubber.

SUMMARY OF THE INVENTION

Following extensive experimentation, an improved process for bonding polyester reinforcement textiles to rubber has been found. Polyester fibrous substrates, such as polyester fibers, cords, fabrics and the like are coated with a dissolved aromatic urethane which undergoes heat disassociation at a temperature in the range of between about 220° F. (104° C.) and about 465° F. (241° C.) to form an aromatic polyisocyanate and which has the formula: $Ar(NHCOX)_n$; wherein Ar is an organic residue containing at least one aromatic nucleus; X is a moiety selected from the group consisting of alkoxy, aryloxy and alkaryloxy and n is greater than about 2. Preferably Ar contains two or more aromatic nuclei. The coated polyester substrate is thereafter coated with a resorcinol-formaldehyde containing latex. The latex coated substrate is heated to a temperature in the range of between about 220° F. (104° C.) and 480° F. (249° C.) and above the thermal disassociation temperature of the aromatic urethane. Thereupon, a layer of rubber is applied to and cured on the treated polyester material.

In advantageous embodiments of the invention, the polyester substrate is treated, as by epoxy coating, to activate its surface prior to coating with the dissolved urethane. It is also preferred to provide the dissolved urethane in a lubricant vehicle. When the resorcinol-formaldehyde coated polyester is to be heat treated at a temperature of above about 440° F. (227° C.), a flexibilizing agent, e.g. raw castor oil, is preferably included with the dissolved urethane coating.

Polyester reinforced rubber articles provided according to the invention exhibit increased and more uniform polyester to rubber adhesion. The dissolved urethane coating is stable for long periods of time, e.g., several months. Thus, polyester reinforcing elements can be precoated in accordance with the invention; stored and then used when needed. Precoating can thus be preformed in a large scale operation, not limited to quantities which can be immediately used. This improves economics of the system and uniformity of bonding from batch to batch.

DETAILED DESCRIPTION OF THE INVENTION

The invention is applicable to any of various polyester textile reinforcement elements such as fibers, yarns, cords, fabrics and the like. The term "polyester" is used herein to mean any high polymeric linear ester obtained by heating one or more glycols of the series HO(CH$_2$)$_n$OH wherein n is greater than 1 but not exceeding 10 with a dicarboxylic and preferably terephthalic acid or an ester forming derivative thereof. The phrase "high polymeric linear esters" is used herein to mean polyesters which are capable of molecular orientation as shown by characteristic x-ray patterns, by drawing or rolling. Examples of ester forming derivatives of terephthalic acid are its aliphathic (including cycloaliphatic) and aryl esters and half-esters, its acid halides and its ammonium and amine salts. Examples of such glycols are ethylene, trimethylene, tetramethylene, hexamethylene and decamethylene glycols. The preferred polymer for purposes of this invention is polyethylene terephthalate. The improved adhesion obtained according to the teachings of this invention may be obtained with all polyethylene terephthalate polymers regardless of their carboxyl end group contents or diethylene glycol content. But, the invention is especially useful in conjunction with polyesters having a low carboxylic end group content. These are typically more difficult to bond to rubber.

Both polyester reinforcing elements which have and have not been previously treated or coated can be treated according to the invention. Advantageously, the polyester element will have been previously treated to increase surface energy and/or to render hydrophilic the polyester surface. Treatments to increase surface energy involve applying a liquid crystalline agent to the surface of polyester fibers, preferably during spinning, and then drawing the fibers under conditions which inhibit chemical reaction between the substrate and the crystalline agent. Such crystalline agents include polyepoxides, polyvinylalcohols, polyvinylacetates and the like. Suitable processes for increasing surface energy are disclosed in U.S. Pat. No. 3,793,425 to Arrowsmith; U.S. Pat. No. 4,044,189 to Arrowsmith and U.S. Pat. No. 4,247,658 to Arrowsmith. The disclosures of these patents are hereby incorporated herein by reference. A preferred method of increasing surface energy involves applying to polyester filaments a spin finish which comprises an epoxide such as dimethylol-bisphenol-A-diepoxide, butanediol diglycidic ether, glycerol epoxide or sorbitol epoxide, together with a suitable basic catalyst. The epoxide is applied in an amount of from 0.02% to 0.5% based on the fiber weight followed by drawing.

The polyester textile element can also be treated to render its surface hydrophilic, for example as by the application of a curable polyepoxide coating followed by curing or by other suitable chemical or physical treatments as will be known to those skilled in the art.

The aromatic urethanes used in the invention are provided by reacting an active aromatic isocyanate which preferably has a functionality of between 2.3 and 3, with an alcohol, phenol or alkylphenol. Such isocyanates will be known to those skilled in the art and include toluene diisocyantes, methylene diphenyl diisocyanates, naphthalene diisocyanates, polymethylenepolyphenylisocyanates, and the like. Superior results have been obtained using polyphenylenepolyisocyanates having an average functionality of 2.7 (PAPI No. 135, commercially available from Upjohn Polymer Chemicals) (MONDUR MRS-10, commercially available from Mobay Chemical Corporation).

The blocking agent can be a lower alkyl alcohol such as propanol, butanol, pentanol and the like; an aromatic alcohol such as phenol; para- or ortho-alkyl phenols such as decylphenol, nonylphenol, octylphenol and the like. The para-alkyl phenols are especially preferred blocking agents because the monomeric urethanes formed therefrom unblock at lower temperatures than other blocked isocyanates. Blocked isocyanates are discussed in ORGANIC ISOCYANATES AND BONDING POLYMERS TO TEXTILES by H. Foulkes and D. L. Loan, RAPRA Technical Review No. 40 (1967) and in BLOCKED ISOCYANATES by Z. W. Wickes, Jr., Progress in Organic Coating, Volume 3, Pages 73-79 (1973). The disclosures of these are hereby incorporated herein by reference.

The urethanes are applied to the polyester textile elements in an amount between about 0.05% to about 1.0% by weight, preferably 0.1 to 0.3% by weight, based on the weight of the textile, as a solution in any suitable organic solvent. Preferably, the urethanes are dissolved in an oily, non-volatile lubricating finish and applied as a topcoat. Advantageously the urethane will consititue from about 20% to about 40% by weight of the lubricating topcoat. When so applied, the total lubricating topcoat with urethane advantageously will be used in an amount of from between about 0.2% by weight to about 2.0% by weight, preferably 0.4 to 1.0% by weight based on the weight of the yarn. Suitable lubricating agents are known to those skilled in the art and include palm oil, coconut oil, cottonseed oil, mineral oil and esters of the predominant fatty acids of said oils; glycerides, polyglycol mono-and di-fatty acid esters, butyl stearate, octyl stearate, esters of oleic acid, trimethylol propane/caprylic acid esters, 2-methyl-2-propyl-propane diol-1,3-dilaurate and 2-ethyl-2-butyl-propane diallyl-1, 3, dilauraute and the like.

Additionally, it is preferred to include a conventional antioxidant compound, for example, an arylamine, an alkylene-bis-phenol, a thio-bis-phenol or the like, in an amount of up to about 5% by weight, based on the weight of the topcoat. The coating can also contain a catalytic amount of a conventional urethane unblocking catalyst as are disclosed in the previously mentioned Wickes, Jr. publication at page 79. Especially preferred are the tin catalysts such as dibutyltindilaurate and the like.

In accordance with another aspect of the invention, the coating containing the dissolved urethane will also contain a flexibilizing agent. Flexibilizing agents are especially advantageous where the coated polyester element is heat treated prior to incorporation into rubber, at a temperature greater than about 440° F. (227° C.). Such high temperature heat treatments are typically conducted on polyester elements that are incorporated into tires and especially truck tires. Flexibilizing agents which can be used in accordance with this aspect of the invention include internal and external plasticizers for polyurethane resins. These materials are known to those skilled in the art and include raw castor oil, polyether polyols such as polypropylene glycol and polyethylene glycols, polyester polyols and hydroxy terminated polyester polyols such as those based on the phthalic esters, carpolactone, and the like.

Inclusion of flexibilizing agents can overcome increase in stiffness and strength loss which can be encountered when polyester fibrous elements treated in accordance with the invention, are heat treated at temperatures above 440° F. (227° C.) prior to incorporation into rubber.

The flexibilizing agents are advantageously included in an amount of between about 5 and about 50% by weight, based on the weight of the urethane, preferably between about 10 and 40% by weight, most preferably about 30 to 40% by weight of the urethane.

Coating can be conducted in a conventional manner, as by spraying, dipping, padding, kiss roll application or the like. If the coating containing the dissolved urethane includes a volatile or otherwise undesirable solvent, the coated polyester can be treated, as by heating, to remove such solvents. But care must be taken that the polyester not be heated sufficiently to convert the urethane to a free isocyanate. Advantageously, the coating containing the dissolved urethane will not contain any such volatile solvent so that intermediate heating is unnecessary.

The polyester bearing the urethane coating is stable and can be stored for extended periods of time. When it is desired to incorporate the same into rubber, it is simply treated in any conventional resorcinol-formaldehyde latex by conventional procedures as are known to those skilled in the art. The resorcinol-formaldehyde latex can contain vinyl pyridine latexes, styrene butadiene latexes, waxes, fillers and other additives.

The latex coated fiber element is thereupon heated to a temperature in the range of between about 220° F. (104° C.) and 480° F. (249° C.) and above the thermal disassociation temperature of the aromatic urethane. The particular heating temperature will depend upon considerations known to those skilled in the art, especially including the contemplated end use of the polyester reinforced rubber article. Thus, for example, polyester tire reinforcing elements are typically heated to about 460° F. (238° C.) or higher; polyester elements used to reinforce V-belts and hose are typically heated to about 440° F. (227° C.) while polyester elements used to reinforce articles such as conveyor belts and similar articles are typically heated at lower temperatures. The thus treated polyester fiber reinforcing element is then applied to and cured in a layer of rubber by means known to those skilled in the art.

The following examples illustrate the best mode contemplated for carrying out the invention.

EXAMPLE 1

A topcoat composition was prepared from the following materials (all percentages by weight):

30% nonylphenol blocked polymeric methylene diphenyl diisocyanate having an isocyanate functionality of 2.4 (commercially available as MONDUR MRS-10 from MOBAY Chemical Corporation).

66.5%, dicocoate ester of tetraethyleneglycol, and 3.5% by weight of a dialkyl phenol sulfide antioxidant.

The topcoat was applied in an amount of about 0.6% by weight, based on the weight of the yarn, to polyester yarns A and B which had been treated during spinning, prior to drawing, with a spin finish containing a glycerol epoxide as the active ingredient. The epoxy composition was applied to the yarns in amount of about 0.15% by weight based on the weight of the yarn. Polyester yarn A is a polyester industrial yarn and polyester yarn B is a similar industrial yarn having a low carboxylic acid end group content.

The topcoated yarns were dipped in a conventional RFL latex adhesive, treated at the temperatures set forth below and incorporated into conventional rubbers by conventional procedures. For comparison the same yarns were topcoated with a conventional butyl stearate lubricant topcoat, treated and tested in the same manner. The resultant rubber samples were tested for adhesion. Results are set forth below: The rating "initial adhesion" represents the average of ratings from ¼ inch H-block adhesion tests on two different rubbers and a 250° F. peel adhesion test force rating and visual rating. The "aged adhesion" value set forth below represents the average of visual and peel force ratings after treatment of the sample for two hours in steam under high temperature. All results are expressed as percentage values based on Polyester Yarn A when treated at 400° F.

|  | Polyester Yarn A No Urethane Topcoat | Polyester Yarn B No Urethane Topcoat | Urethane Topcoated Polyester Yarn A | Urethane Topcoated Polyester Yarn B |
| --- | --- | --- | --- | --- |
| Treating Temp. | | | 350° F. | |
| Initial Adhesion | 100 | 88 | 163 | 121 |
| Aged Adhesion | 100 | 89 | 183 | 126 |
| % Strength Conversion | 99 | 98 | 98 | 98 |
| Treating Temp. | | | 400° F. | |
| Initial Adhesion | 100 | 77 | 145 | 115 |
| Aged Adhesion | 100 | 100 | 184 | 164 |
| % Strength Conversion | 100 | 97 | 96 | 96 |
| Treating Temp. | | | 465° F. | |
| Initial Adhesion | 100 | 97 | 98 | 95 |
| Aged Adhesion | 100 | 92 | 208 | 150 |
| % Strength Conversion | 93 | 94 | 90 | 90 |

As can be seen from the above, adhesion values were significantly improved with the topcoated yarns. At the same time, strength loss was minimal. Especially to be noted are the aged adhesion increases. It is believed that aged adhesion tests are a more accurate predictor of performance in rubber articles such as tires, conveyor belts and the like.

EXAMPLE 2

A topcoat was prepared identically to Example 1 except that the blocked isocyanate used was n-butanol blocked polymeric methylene diphenyl diisocyanate having a functionality of 2.7 (MONDUR MR available from Mobay Chemical Company). The topcoat was applied in an amount of 0.6% by weight, based on the weight of the yarn to polyester yarn B as in Example 1. The yarn was dipped in a conventional RFL latex, heated at the temperatures set forth below, incorporated into rubber samples which were then tested for adhesion. Results are set forth below;

|  | Polyester Yarn B No Topcoat | Topcoated Polyester Yarn B |
| --- | --- | --- |
| Treating Temp. | 350° F. | |
| Initial Adhesion | 100 | 107 |
| Aged Adhesion | 100 | 100 |
| % Strength Conversion | 99 | 98 |
| Treating Temp. | 400° F. | |
| Initial Adhesion | 100 | 100 |
| Aged Adhesion | 100 | 100 |
| % Strength Conversion | 98 | 96 |
| Treating Temp. | 465° F. | |
| Initial Adhesion | 100 | 107 |
| Aged Adhesion | 100 | 118 |
| % Strength Conversion | 95 | 93 |

EXAMPLE 3

Example 2 was repeated except that the blocked isocyanate used in the topcoat was n-butanol blocked polymeric methylene diphenyl diisocyanate having a functionality of 2.4 (MONDUR MRS-10, commercially from Mobay Chemical) results are set forth below:

|  | Polyester Yarn B No Topcoat | Topcoated Polyester Yarn B |
|---|---|---|
| Treating Temp. |  | 350° F. |
| Initial Adhesion | 100 | 100 |
| Aged Adhesion | 100 | 100 |
| % Strength Conversion | 99 | 96 |
| Treating Temp. |  | 400° F. |
| Initial Adhesion | 100 | 106 |
| Aged Adhesion | 100 | 117 |
| % Strength Conversion | 98 | 100 |
| Treating Temp. |  | 465° F. |
| Initial Adhesion | 100 | 78 |
| Aged Adhesion | 100 | 129 |
| % Strength Conversion | 95 | 91 |

EXAMPLE 4

This example demonstrates the effect of flexibilizing agents. Topcoat compositions were prepared wherein the blocked isocyanate, i.e., urethane, used was nonylphenol blocked polymeric methylene diphenyl diisocyanate, as in Example 1. The topcoats were formulated to contain the same amounts of the same lubricant and antioxidant as in Example 1. The remaining 30% of the topcoat consisted of the combination of the nonylphenol blocked isocyanate and the flexibilizing agent, in the amounts shown below.

The topcoat was applied in an amount of 0.6% by weight, based on the weight of the yarn to a polyester industrial yarn having a low carboxylic end group content. The yarn had been treated during spinning, prior to drawing with a spin finish containing a glycerol epoxide as the active ingredient. The epoxy composition had been applied to the yarns in an amount of about 0.15% by weight, based on the weight of the yarn.

The yarns were dipped in a conventional RFL latex adhesive, treated first at a temperature of 350° F., followed by tretment at 455° F. and then incorporated into conventional rubbers by conventional procedures. Adhesion was tested in the same manner and using the same tests as in Example 1. Results are set forth below wherein the values represent percentages based on the same yarn treated with the same spin finish but topcoated with a conventional butyl stearate based topcoat.

|  | Nonylphenol Blocked Isocyanate Wt. % | | | | |
|---|---|---|---|---|---|
| Flexibilizer | 30 None | 25.7 Raw Castor Oil | 20 Raw Castor Oil | 25.7 Polypropylene Glycol | 20 Polypropylene Glycol |
| Flexibilizer Wt. % | 0 | 4.3 | 10 | 4.3 | 10 |
| % Strength Conversion | 96 | 97 | 97 | 96 | 95 |
| Stiffness | 141 | 153 | 116 | 134 | 110 |
| Initial Adhesion | 105 | 111 | 112 | 107 | 103 |
| Aged Adhesion | 112 | 118 | 114 | 118 | 112 |

It can be seen that flexibilizing agents can reduce stiffness without affecting adhesion especially when used in high concentrations. Strength of the treated cord was not severely affected by use of the flexibilizing agent.

The invention has been described in considerable detail with reference to perferred embodiments. But variations and modifications can be made without departing from the invention as described in the foregoing specification and defined in the appended claims.

What is claimed is:

1. The process of bonding polyester reinforcement fibers to rubber consisting essentially of:
   providing polyester reinforcement fibers bearing a coating consisting essentially of an organic solution of a dissolved aromatic urethane having the formula $Ar(NHCOX)_n$ wherein Ar is an organic residue containing at least one aromatic nucleus, X is a moiety selected from the group consisting of alkoxy, aryloxy and alkaryloxy and n is greater than about 2;
   said aromatic urethane exhibiting thermal disassociation at a temperature in the range of between 220° F. and about 465° F., thereby forming an aromatic isocyanate;
   said dissolved aromatic urethane solution additionally comprising a flexibilizing agent in an amount of between 5 and about 50 percent by weight based on the weight of said aromatic urethane and being substantially free of free isocyanate;
   coating said polyester reinforcement fibers bearing said dissolved urethane coating with a latex comprising resorcinol-formaldehyde resin, heating said latex coated fibers to a temperature in the range of between about 220° F. and about 480° F. and above the thermal disassociation temperature of said aromatic urethane, and applying to and curing a layer of rubber on said treated polyester reinforcement fibers.

2. The process of claim 1 wherein said dissolved aromatic urethane organic solution comprises a lubricant finish.

3. The process of claim 2 wherein said polyester reinforcement fibers are treated prior to application of said dissolved urethane coating, to activate the surface of said polyester.

4. The process of claim 3 wherein said surface activation treatment provides an increase in surface energy of said polyester reinforcement fibers.

5. The process of claim 3 wherein said polyester surface activation treatment comprises the application of a polyepoxide spin finish to said polyester reinforcement fibers.

6. The process of claim 2 wherein X is alkaryloxy.

7. The process of claim 6 wherein X comprises para- or ortho nonylphenoxy.

8. The process of claim 3 wherein said flexibilizing agent is present in an amount of about 10 to about 40% by weight, based on the weight of said aromatic urethane.

9. The process of claim 8 wherein X is alkylphenoxy.

10. The process of claim 9 wherein said polyester surface activation treatment comprises application of a polyepoxide coating to said polyester reinforcement fibers.

* * * * *